US012395866B2

(12) United States Patent
Zhou et al.

(10) Patent No.: US 12,395,866 B2
(45) Date of Patent: Aug. 19, 2025

(54) DETERMINING A BEAM FAILURE INSTANCE COUNT FOR BEAM FAILURE DETECTION

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 160 days.

(21) Appl. No.: 17/444,644

(22) Filed: Aug. 6, 2021

(65) Prior Publication Data

US 2023/0041404 A1 Feb. 9, 2023

(51) Int. Cl.
*H04W 24/04* (2009.01)
*G06N 20/00* (2019.01)
*H04L 5/00* (2006.01)
*H04W 8/22* (2009.01)
*H04W 72/20* (2023.01)

(52) U.S. Cl.
CPC .......... *H04W 24/04* (2013.01); *H04L 5/0048* (2013.01); *H04W 8/22* (2013.01); *H04W 72/20* (2023.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0281480 A1* | 9/2019 | Wei | H04W 24/08 |
| 2019/0372830 A1* | 12/2019 | Zhang | H04B 7/0695 |
| 2020/0052769 A1* | 2/2020 | Cirik | H04L 1/0026 |
| 2020/0100311 A1* | 3/2020 | Cirik | H04W 72/23 |
| 2020/0153542 A1* | 5/2020 | Zhou | H04W 52/221 |
| 2020/0236570 A1* | 7/2020 | Wei | H04B 7/0617 |
| 2021/0037589 A1* | 2/2021 | Yoshioka | H04W 24/04 |
| 2021/0067234 A1* | 3/2021 | Guan | H04W 24/08 |
| 2021/0091845 A1* | 3/2021 | Wu | H04W 24/04 |
| 2021/0105172 A1* | 4/2021 | Luo | H04W 74/0833 |
| 2021/0105176 A1* | 4/2021 | Tsai | H04W 72/23 |
| 2021/0153245 A1* | 5/2021 | Tooher | H04W 74/006 |
| 2021/0250794 A1* | 8/2021 | Wei | H04W 24/08 |
| 2021/0274569 A1* | 9/2021 | Jiang | H04B 7/0695 |
| 2021/0314218 A1* | 10/2021 | Kang | H04B 7/0695 |
| 2021/0376901 A1* | 12/2021 | Cirik | H04L 5/0094 |
| 2022/0046438 A1* | 2/2022 | Lo | H04L 5/0048 |
| 2022/0046740 A1* | 2/2022 | Lo | H04W 24/04 |
| 2022/0085862 A1* | 3/2022 | Kung | H04B 7/024 |
| 2022/0109489 A1* | 4/2022 | Zhu | H04B 7/088 |
| 2022/0117024 A1* | 4/2022 | Saber | H04B 7/0695 |

(Continued)

*Primary Examiner* — Chirag G Shah
*Assistant Examiner* — Suk Jin Kang
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a beam failure detection reference signal (BFD-RS). The UE may determine, autonomously at the UE based at least in part on the BFD-RS, a beam failure instance (BFI) count for different types of BFI including BFI noise and BFI interference. The UE may detect a beam failure based at least in part on the BFI count satisfying a threshold. Numerous other aspects are described.

30 Claims, 5 Drawing Sheets

(56) References Cited

U.S. PATENT DOCUMENTS

| | | | |
|---|---|---|---|
| 2022/0124819 A1* | 4/2022 | Zhang | H04B 7/0695 |
| 2022/0159767 A1* | 5/2022 | Zhang | H04W 76/18 |
| 2022/0182281 A1* | 6/2022 | Cirik | H04W 72/046 |
| 2022/0210857 A1* | 6/2022 | Cirik | H04L 5/0023 |
| 2022/0216947 A1* | 7/2022 | Kim | H04L 1/1819 |
| 2022/0224394 A1* | 7/2022 | Berggren | H04B 7/06964 |
| 2022/0231810 A1* | 7/2022 | Matsumura | H04L 5/0023 |
| 2022/0240144 A1* | 7/2022 | Cirik | H04B 7/0695 |
| 2022/0256387 A1* | 8/2022 | Xiao | H04L 5/0053 |
| 2022/0278731 A1* | 9/2022 | Koskela | H04B 7/0695 |
| 2022/0286183 A1* | 9/2022 | Yi | H04L 5/0053 |
| 2022/0294512 A1* | 9/2022 | Matsumura | H04W 76/19 |
| 2022/0302985 A1* | 9/2022 | Zhang | H04L 5/0023 |
| 2022/0311501 A1* | 9/2022 | Koskela | H04W 76/19 |
| 2022/0330055 A1* | 10/2022 | Babaei | H04B 7/088 |
| 2022/0346139 A1* | 10/2022 | Tooher | H04W 72/0453 |
| 2022/0360314 A1* | 11/2022 | Zhu | H04L 5/0051 |
| 2022/0368406 A1* | 11/2022 | Kang | H04B 7/0695 |
| 2023/0006727 A1* | 1/2023 | Jang | H04L 5/0051 |
| 2023/0007513 A1* | 1/2023 | Babaei | H04W 76/27 |
| 2023/0023041 A1* | 1/2023 | Yi | H04L 5/0048 |
| 2023/0028423 A1* | 1/2023 | Xu | H04B 7/0663 |
| 2023/0051047 A1* | 2/2023 | Xu | H04L 5/0048 |
| 2023/0123593 A1* | 4/2023 | Cao | H04B 7/0695 370/329 |
| 2023/0198602 A1* | 6/2023 | Zeineddine | H04W 76/19 370/329 |
| 2023/0199584 A1* | 6/2023 | Xu | H04W 72/046 455/436 |
| 2023/0199890 A1* | 6/2023 | Cirik | H04W 74/0833 370/228 |
| 2024/0023184 A1* | 1/2024 | Gu | H04W 16/28 |
| 2024/0064839 A1* | 2/2024 | Xu | H04B 7/06966 |
| 2024/0178903 A1* | 5/2024 | Go | H04B 7/06964 |
| 2024/0251262 A1* | 7/2024 | Eldessoki | H04B 7/0695 |
| 2025/0038823 A1* | 1/2025 | Go | H04L 5/0094 |

\* cited by examiner

DETERMINING A BEAM FAILURE INSTANCE COUNT FOR BEAM FAILURE DETECTION

FIELD OF THE DISCLOSURE

Aspects of the present disclosure generally relate to wireless communication and to techniques and apparatuses for determining a beam failure instance (BFI) count for beam failure detection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a base station, a beam failure detection reference signal (BFD-RS); determine, autonomously at the UE based at least in part on the BFD-RS, a beam failure instance (BFI) count for different types of BFI including BFI noise and BFI interference; and detect a beam failure based at least in part on the BFI count satisfying a threshold.

In some implementations, a method of wireless communication performed by a UE includes receiving, from a base station, a BFD-RS; determining, autonomously at the UE based at least in part on the BFD-RS, a BFI count for different types of BFI including BFI noise and BFI interference; and detecting a beam failure based at least in part on the BFI count satisfying a threshold.

In some implementations, a non-transitory computer-readable medium storing a set of instructions for wireless communication includes one or more instructions that, when executed by one or more processors of a UE, cause the UE to: receive, from a base station, a BFD-RS; determine, autonomously at the UE based at least in part on the BFD-RS, a BFI count for different types of BFI including BFI noise and BFI interference; and detect a beam failure based at least in part on the BFI count satisfying a threshold.

In some implementations, an apparatus for wireless communication includes means for receiving, from a base station, a BFD-RS; means for determining, autonomously at the UE based at least in part on the BFD-RS, a BFI count for different types of BFI including BFI noise and BFI interference; and means for detecting a beam failure based at least in part on the BFI count satisfying a threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
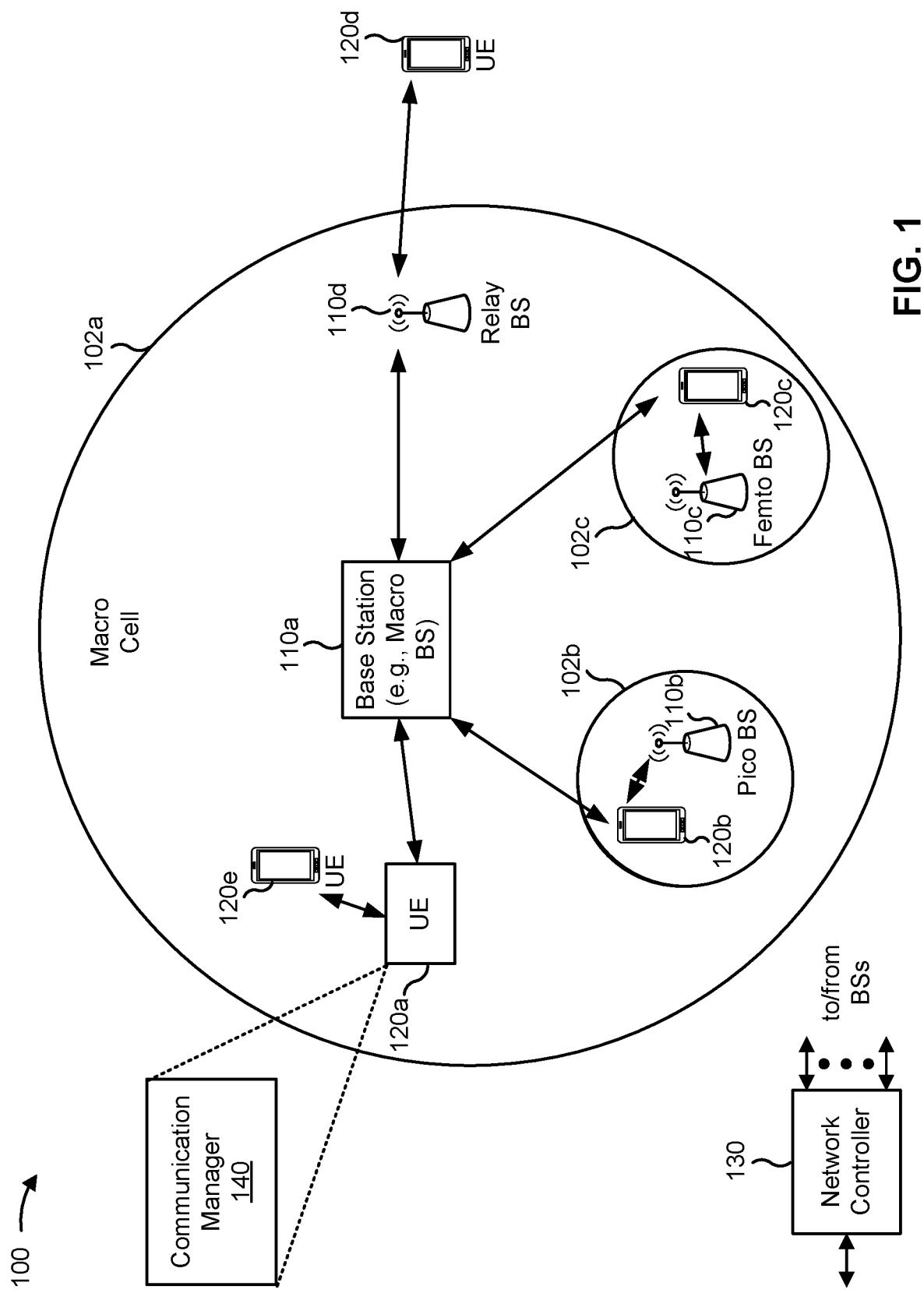
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, a beam failure detection reference signal (BFD-RS); determine, autonomously at the UE based at least in part on the BFD-RS, a BFI count for different types of BFI including BFI noise and BFI interference; and detect a beam failure based at least in part on the BFI count satisfying a threshold. Additionally, or alternatively, the communication manager 140 may perform one or more other operations described herein.

As indicated above, FIG. 1 is provided as an example. Other examples may differ from what is described with regard to FIG. 1.

Figure 2:
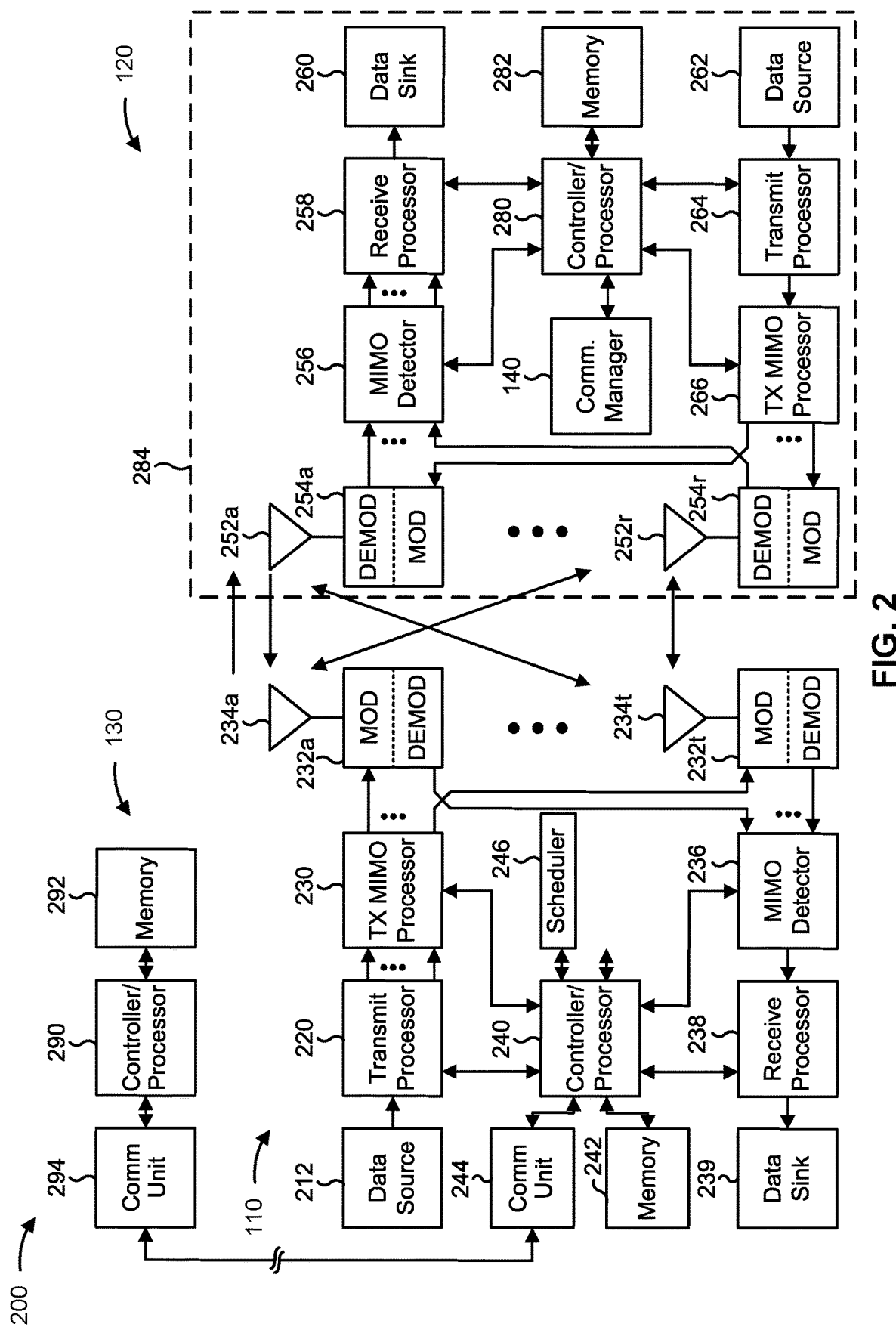
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-5).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-5).

The controller/processor 240 of the base station 110, the controller/processor 280 of the UE 120, and/or any other component(s) of FIG. 2 may perform one or more techniques associated with determining a BFI count for beam failure detection, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, a BFD-RS; means for determining, autonomously at the UE based at least in part on the BFD-RS, a BFI count for different types of BFI including BFI noise and BFI interference; and/or means for detecting a beam failure based at least in part on the BFI count satisfying a threshold. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

During a legacy beam failure detection procedure, a UE may detect a beam failure based at least in part on counting BFI indications. A BFI indication may be based at least in part on a periodic BFD-RS, which may include a channel state information reference signal (CSI-RS) and/or a synchronization signal block (SSB). The BFI indication may be triggered when an estimated block error rate (BLER) associated with the periodic BFD-RS satisfies a BLER threshold.

During the legacy beam failure detection procedure, a medium access control (MAC) layer of the UE may determine that a BFI indication has been received from a lower layer, such as a physical (PHY) layer. A receipt of the BFI indication may be triggered by the estimated BLER associated with the periodic BFD-RS satisfying the BLER threshold. The MAC layer may correspond to a serving cell configured for beam failure detection. When the MAC layer determines that the BFI indication has been received from the lower layer, the MAC layer may start a beam failure detection timer. Further, the MAC layer may increment a BFI counter by one. The BFI counter may be per serving cell and may initially be set to zero. When the BFI counter satisfies a beam failure instance maximum count, the MAC layer may trigger a beam failure recovery for the serving cell.

The legacy beam failure detection procedure suffers from various shortcomings. First, the BFI is limited to a single type of BFI. The BFI does not distinguish between noise and interference. Noise may be a significant factor when determining radio link quality. On the other hand, interference may be temporary, and should not be considered equal to noise for the BFI. Further, the counting of BFI indications in the legacy beam failure detection procedure is linear and is based at least in part on BFI indications that are reported from the lower layer. For example, the BFI count may be incremented by one for each BFI indication that is reported from the lower layer. However, the linear counting of BFI indications by adding a value of one for each BFI indication may be limiting and does not consider different BFI types. Further, the legacy beam failure detection procedure provides no autonomy for the UE, as a base station configures a BFD-RS and a BFI configuration for the UE, and the UE linearly performs the counting of the BFI indications in accordance with the BFI configuration.

In various aspects of techniques and apparatuses described herein, a UE may receive, from a base station, a BFD-RS. The BFD-RS may be a CSI-RS or an SSB. The UE may determine, autonomously at the UE based at least in part on the BFD-RS, a BFI count for different types of BFI including BFI noise and BFI interference. The different types of BFI may be based at least in part on UE autonomous BFI criteria. The UE may determine the BFI count based at least in part on UE autonomous counting techniques. The UE may determine the BFI count based at least in part on a first count associated with the BFI noise and a second count associated with the BFI interference. Alternatively, the UE may determine the BFI count using a machine learning model, which may output the BFI count based at least in part on various inputs, such as BFI indication reports and/or channel measurements associated with the BFD-RS. The UE may detect a beam failure based at least in part on the BFI count satisfying a threshold.

In some aspects, the UE may perform beam failure detection in a more autonomous manner based at least in part on increasing processing capabilities at the UE. The UE may perform the beam failure detection by considering different BFI types (e.g., BFI noise and BFI interference) and associated counting techniques. In some cases, the UE may perform the beam failure detection using machine learning techniques. The beam failure detection may result in an improved beam failure detection reaction time to beam failure events and may reduce a UE processing delay. The UE may not need to wait for instructions from the base station to detect beam failures. The beam failure detection may reduce resource usage at the base station, as less resources may be used at the base station to control the UE. The beam failure detection may have improved accuracy due to more sophisticated BFI instance counting techniques and/or different types of BFIs to distinguish between noise and interference.

Figure 3:
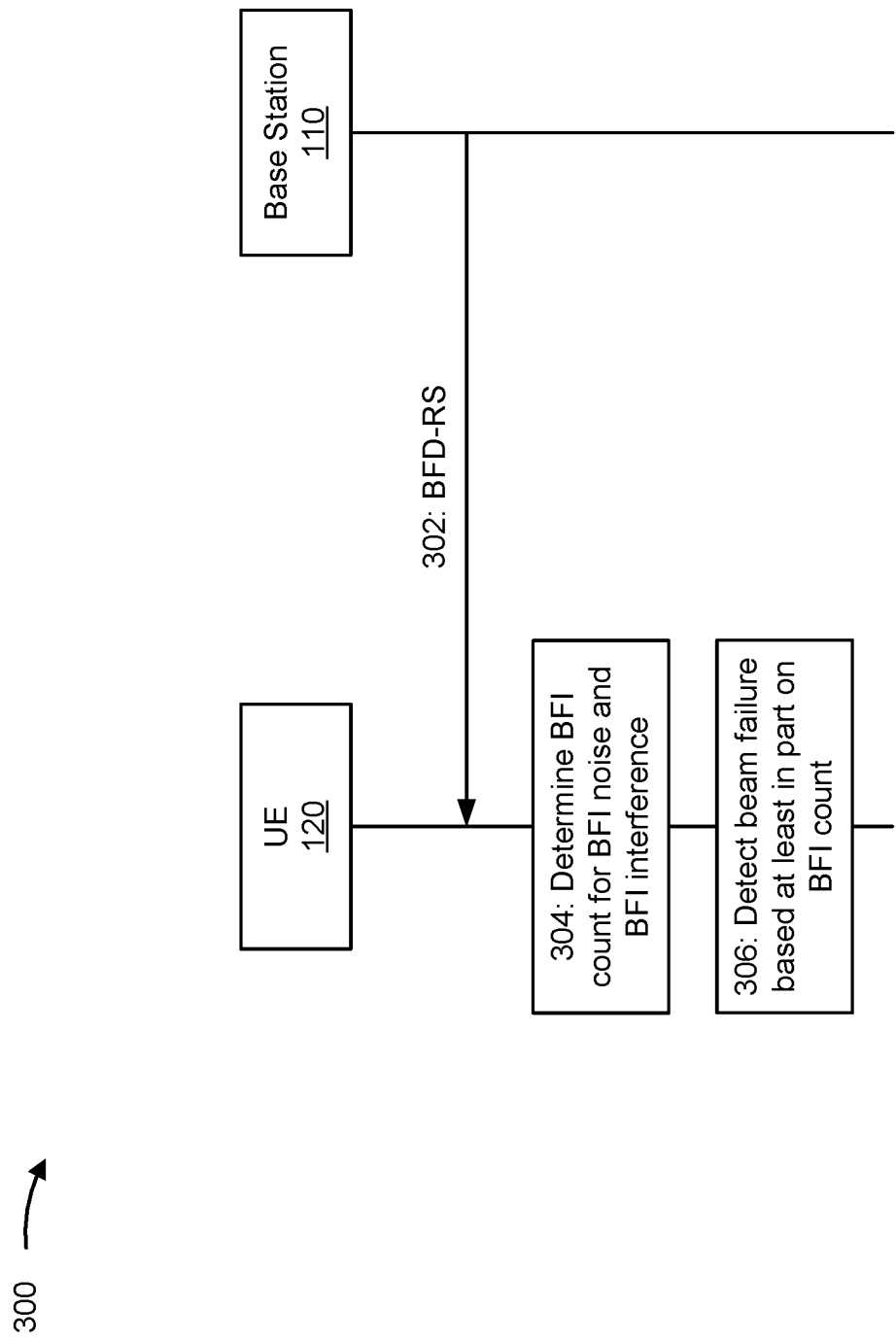
FIG. 3 is a diagram illustrating an example associated with determining a beam failure instance (BFI) count for beam failure detection, in accordance with the present disclosure.

FIG. 3 is a diagram illustrating an example 300 associated with determining a BFI count for beam failure detection, in accordance with the present disclosure. As shown in FIG. 3, example 300 includes communication between a UE (e.g., UE 120) and a base station (e.g., base station 110). In some aspects, the UE and the base station may be included in a wireless network, such as wireless network 100.

As shown by reference number 302, the UE may receive, from the base station, a BFD-RS. The BFD-RS may be a periodic reference signal. In some cases, the BFD-RS may be a CSI-RS or an SSB.

In some aspects, the UE may categorize a BFI into various types of BFIs. A first type of BFI may be a BFI noise. The BFI noise may indicate that a current poor radio link quality is mainly due to noise, and the BFI noise maybe considered when detecting beam failure. A second type of BFI may be a BFI interference. The BFI interference may indicate that a current poor radio link quality is mainly due to interference, and the BFI interference may be considered to be less important as compared to the BFI noise when detecting the beam failure.

In some aspects, the BFI noise may indicate that a current radio link quality is affected by signal noise. The BFI interference may indicate that the current radio link quality is affected by signal interference. The BFI interference may be associated with a lower priority as compared to the BFI noise for beam failure detection.

In some aspects, the UE may determine the BFI noise or the BFI interference by comparing a signal-to-inference-plus-noise ratio (SINR) measurement of the BFD-RS and a signal-to-noise ratio (SNR) measurement of the BFD-RS. For example, the UE may determine BFI noise based at least in part on an SINR measurement that is relatively low and an SNR measurement that is relatively low. As another example, the UE may determine BFI interference based at least in part on an SINR measurement that is relatively low and an SNR measurement that is relatively high. As yet another example, the UE may determine no BFI based at least in part on an SINR measurement that is relatively high. In other words, a low SINR and a low SNR may indicate the BFI noise, a low SINR and a high SNR may indicate the BFI interference, and a high SINR may indicate no BFI. In some aspects, the UE may determine other types of BFI not including BFI noise and BFI interference.

"Low SINR" may refer to an SINR level that satisfies a low SINR threshold, "low SNR" may refer to an SNR level that satisfies a low SNR threshold, "high SNR" may refer to an SNR level that satisfies a high SNR threshold, and "high SINR" may refer to an SINR level that satisfies a high SINR threshold.

In some aspects, the base station may signal/configure multiple options of calculation techniques for BFI types, which may allow the UE to autonomously select one of the BFI types calculation techniques. A BFI types calculation technique may enable the UE to determine different types of BFIs from the BFD-RS, such as the BFI noise and/or the BFI interference. The base station may signal/configure the multiple options via a radio resource control (RRC) configuration. The base station may signal/configure the multiple options via a medium access control control element (MAC-CE) or downlink control information (DCI). Alternatively, the UE may be preconfigured with the multiple options of BFI types calculation techniques.

As shown by reference number 304, the UE may determine, autonomously based at least in part on the BFD-RS, a BFI count for different types of BFI including BFI noise and BFI interference. The UE may determine the BFI count based at least in part on separate counters associated with the BFI noise and the BFI interference. Alternatively, the UE may determine the BFI count based at least in part on a machine learning model.

In some aspects, the UE may identify a first count associated with the BFI noise based at least in part on a first counter dedicated to BFI noise. The UE may identify a second count associated with the BFI interference based at least in part on a second counter dedicated to BFI interference. The UE may obtain the BFI count based at least in part on a function that considers the first count, the second count, and a weight associated with the BFI interference, where the BFI count may include separate counts for the BFI noise and the BFI interference.

In some aspects, the UE may implement a BFI counting technique for beam failure detection. The UE may maintain the separate counters for the BFI noise and the BFI interference. The BFI noise may be associated with a count_a, and the BFI interference may be associated with a count_b. In some aspects, a count total (count_total) may be equal to f(count_a, count_b), where f is a function. As an example, count_total may be equal to count_a+w*count_b, where w is a weight on BFI interference, and where $0 \leq w \leq 1$. The UE may compare the count_total to a beam failure instance maximum count, and when the count_total exceeds the beam failure instance maximum count, the UE may declare beam failure.

In some aspects, the UE may provide, as an input to the machine learning model, one or more BFI indication reports and one or more channel measurements associated with the BFD-RS. The one or more channel measurements may include an SINR measurement, an SNR measurement, an RSRP measurement, and/or an interference measurement. The UE may obtain, as an output of the machine learning model, the BFI count for the BFI noise and the BFI interference. The BFI count may be provided from a physical layer of the UE to a MAC layer of the UE for beam failure detection. The BFI count may include separate counts for the BFI noise and the BFI interference.

In some aspects, the UE may determine a BFI count based at least in part on the machine learning model (e.g., a neural network). The UE may input various types of information into the machine learning model, such as BFI reports and/or channel measurements. The channel measurements may be SINR measurements, SNR measurements, RSRP measurements, and/or interference measurements. The channel measurements may be collected over a measurement window, and the channel measurements may be associated with a quantity of past BFD-RSs. The machine learning model may receive the various types of information as input, and the machine learning model may output the BFI count based at least in part on the input. The BFI count may consider BFI noise and BFI interference. The UE may compare the BFI count outputted from the machine learning model to the beam failure instance maximum count, and when the BFI count exceeds the beam failure instance maximum count, the UE may declare beam failure. For example, the BFI count outputted from the machine learning model may be reported from a lower layer of the UE to a MAC layer of the UE, where the MAC layer of the UE may be responsible for comparing the BFI count to the beam failure instance maximum count and determining whether to declare beam failure. In some aspects, the machine learning model may repeatedly calculate the BFI count based at least in part on a moving time window, and the BFI count may be compared to the beam failure instance maximum count for beam failure detection.

In some aspects, a machine learning model approach for determining the BFI count may not involve an incremental linear increase or an incremental weighted increase based at least in part on BFI count indications reported from the lower layer of the UE to the MAC layer of the UE. Rather, the BFI count determined using the machine learning model may depend on the various types of information, such as the BFI indication reports and/or the channel measurements. In some aspects, a machine learning model that is trained using a training data set may be deployed onto the UE. The training data set may indicate BFI indication reports and channel measurements and corresponding BFI counts, which may be used to train the machine learning model to output accurate BFI counts. In some aspects, the base station may transmit the machine learning model to the UE, and the base station may periodically provide updates for the machine learning model.

In some aspects, the base station may signal/configure multiple options of BFI counting techniques, which may allow the UE to autonomously select one of the BFI counting techniques. A BFI counting technique may enable the UE to count different types of BFIs, such as the BFI noise and the BFI interference. The BFI counting technique may use a formula that considers the BFI noise, the BFI interference, and the weight on the BFI interference. The base station may signal/configure the multiple options via an RRC configuration. The base station may signal/configure the multiple options via a MAC-CE or DCI. Alternatively, the UE may be preconfigured with the multiple options of BFI counting techniques.

In some aspects, the UE may receive, from the base station, signaling that configures a first set of options associated with determining different types of BFIs including the BFI noise and the BFI interference. The UE may autonomously select one option from the first set of options. The signaling may be received via an RRC configuration or a MAC-CE. In some aspects, the UE may receive, from the base station, signaling that configures a second set of options associated with determining BFI counts based at least in part on the different types of BFIs. The UE may autonomously select one option from the second set of options. The signaling may be received via the RRC configuration or the MAC-CE.

In some aspects, the UE may signal a UE capability message to the base station. The UE capability message may indicate machine learning features, processing power and capacity, memory, and/or computation resources. The UE may signal the UE capability message via a MAC-CE or via uplink control information (UCI).

In some aspects, autonomy activation/deactivation may be based at least in part on a UE reported capability. The base station may activate/deactivate UE autonomy for beam failure detection via signaling to the UE, where the signaling may be via a MAC-CE or DCI. In some aspects, the UE may transmit a request, to the base station, to activate/deactivate UE autonomy for beam failure detection via signaling to the base station, where the signaling may be via a MAC-CE or UCI.

In some aspects, the UE may transmit, to the base station via a MAC-CE or UCI, UE capability information that indicates the machine learning features of the UE, the processing power and capacity of the UE, a memory configuration of the UE, and/or the computation resources of the UE. The UE may receive, from the base station via a MAC-CE or DCI and based at least in part on the UE capability information, a configuration that activates UE autonomy, deactivates UE autonomy, or changes a UE autonomy level for determining the BFI count and detecting the beam failure based at least in part on the BFI count. In some aspects, the UE may transmit, to the base station via a MAC-CE or UCI, a request to activate UE autonomy or deactivate UE autonomy for determining the BFI count and detecting the beam failure based at least in part on the BFI count.

As shown by reference number 306, the UE may detect a beam failure based at least in part on the BFI count satisfying a threshold. The UE may determine the BFI count based at least in part on the separate counters associated with the BFI noise and the BFI interference. Alternatively, the UE may determine the BFI count based at least in part on a machine learning model. The UE may compare the BFI count with the threshold (e.g., a beam failure instance maximum count), and the UE may detect the beam failure and initiate a beam failure recovery.

As indicated above, FIG. 3 is provided as an example. Other examples may differ from what is described with regard to FIG. 3.

Figure 4:
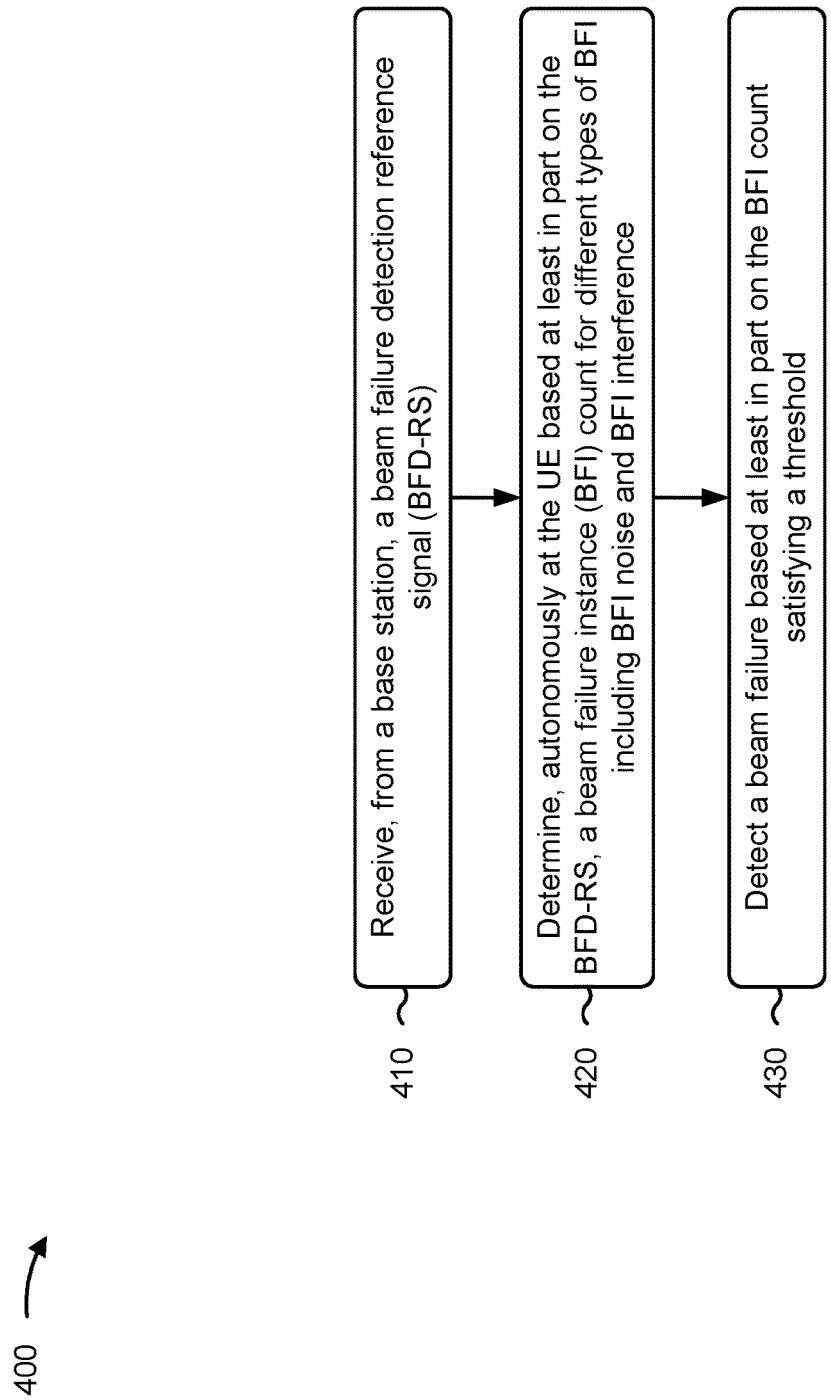
FIG. 4 is a diagram illustrating an example process associated with determining a BFI count for beam failure detection, in accordance with the present disclosure.

FIG. 4 is a diagram illustrating an example process 400 performed, for example, by a UE, in accordance with the present disclosure. Example process 400 is an example where the UE (e.g., UE 120) performs operations associated with determining a BFI count for beam failure detection.

As shown in FIG. 4, in some aspects, process 400 may include receiving, from a base station, a BFD-RS (block 410). For example, the UE (e.g., using communication manager 140 and/or reception component 502, depicted in FIG. 5) may receive, from a base station, a BFD-RS, as described above.

As further shown in FIG. 4, in some aspects, process 400 may include determining, autonomously at the UE based at least in part on the BFD-RS, a BFI count for different types of BFI including BFI noise and BFI interference (block 420). For example, the UE (e.g., using communication manager 140 and/or determination component 508, depicted in FIG. 5) may determine, autonomously at the UE based at least in part on the BFD-RS, a BFI count for different types of BFI including BFI noise and BFI interference, as described above.

As further shown in FIG. 4, in some aspects, process 400 may include detecting a beam failure based at least in part on the BFI count satisfying a threshold (block 430). For example, the UE (e.g., using communication manager 140 and/or detection component 510, depicted in FIG. 5) may detect a beam failure based at least in part on the BFI count satisfying a threshold, as described above.

Process 400 may include additional aspects, such as any single aspect or any combination of aspects described below and/or in connection with one or more other processes described elsewhere herein.

In a first aspect, the BFI noise indicates that a current radio link quality is affected by signal noise, wherein the BFI interference indicates that the current radio link quality is affected by signal interference, and the BFI interference is associated with a lower priority as compared to the BFI noise for beam failure detection.

In a second aspect, alone or in combination with the first aspect, process 400 includes determining the BFI noise or the BFI interference by comparing an SINR measurement of the BFD-RS with an SNR measurement of the BFD-RS, wherein a low SINR and a low SNR indicates the BFI noise, a low SINR and a high SNR indicates the BFI interference, and a high SINR indicates no BFI.

In a third aspect, alone or in combination with one or more of the first and second aspects, process 400 includes identifying a first count associated with the BFI noise based at least in part on a first counter dedicated to BFI noise, identifying a second count associated with the BFI interference based at least in part on a second counter dedicated to BFI interference, and obtaining the BFI count based at least in part on a function that considers the first count, the second count, and a weight associated with the BFI interference, wherein the BFI count includes separate counts for the BFI noise and the BFI interference.

In a fourth aspect, alone or in combination with one or more of the first through third aspects, process 400 includes providing, as an input to a machine learning model, one or more BFI indication reports and one or more channel measurements associated with the BFD-RS, wherein the one or more channel measurements include one or more of an SINR measurement, an SNR measurement, an RSRP measurement, or an interference measurement, and obtaining, as an output of the machine learning model, the BFI count for the BFI noise and the BFI interference, wherein the BFI count is provided from a physical layer of the UE to a MAC layer of the UE for beam failure detection, and the BFI count includes separate counts for the BFI noise and the BFI interference.

In a fifth aspect, alone or in combination with one or more of the first through fourth aspects, process 400 includes receiving, from the base station, signaling that configures a first set of options associated with determining different types of BFIs including the BFI noise and the BFI interference, wherein one option from the first set of options is autonomously selected at the UE, and wherein the signaling is received via an RRC configuration or a MAC-CE, and receiving, from the base station, signaling that configures a second set of options associated with determining BFI counts based at least in part on the different types of BFIs, wherein one option from the second set of options is autonomously selected at the UE, and the signaling is received via the RRC configuration or the MAC-CE.

In a sixth aspect, alone or in combination with one or more of the first through fifth aspects, process 400 includes transmitting, to the base station via a MAC-CE or UCI, UE capability information that indicates one or more of machine learning features of the UE, a processing power and capacity of the UE, a memory configuration of the UE, or computation resources of the UE, and receiving, from the base station via a MAC-CE or DCI and based at least in part on the UE capability information, a configuration that activates UE autonomy, deactivates UE autonomy, or changes a UE autonomy level for determining the BFI count and detecting the beam failure based at least in part on the BFI count.

In a seventh aspect, alone or in combination with one or more of the first through sixth aspects, process 400 includes transmitting, to the base station via a MAC-CE or UCI, a request to activate UE autonomy or deactivate UE autonomy for determining the BFI count and detecting the beam failure based at least in part on the BFI count.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
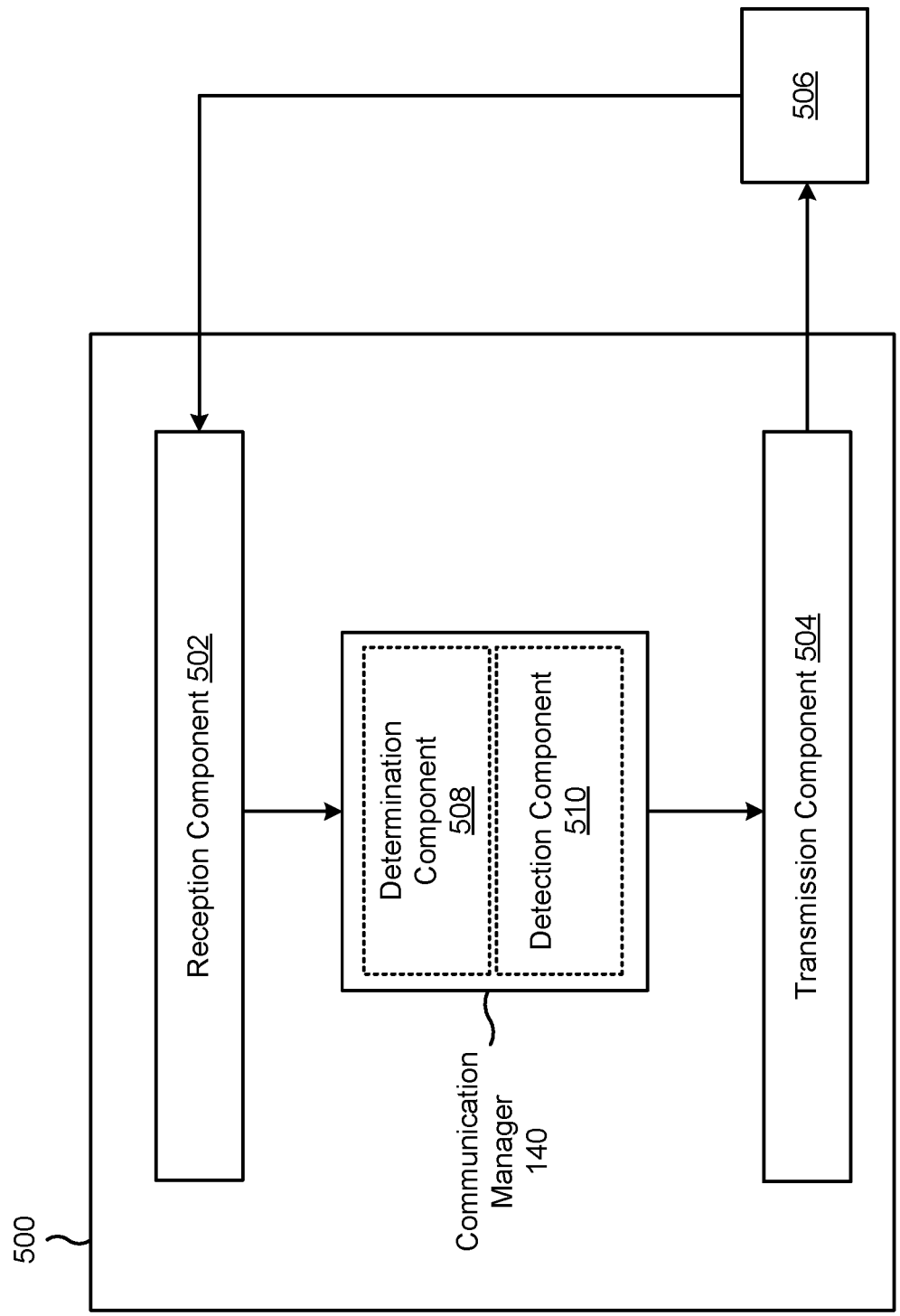
FIG. 5 is a diagram of an example apparatus for wireless communication, in accordance with the present disclosure.

FIG. 5 is a diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 140. The communication manager 140 may include one or more of a determination component 508, or a detection component 510, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a modem, a demodulator, a MIMO detector, a receive processor, a controller/processor, a memory, or a combination thereof, of the UE described in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the UE described in connection with FIG. 2. In some aspects, the transmission component 504 may be co-located with the reception component 502 in a transceiver.

The reception component 502 may receive, from a base station, a BFD-RS. The determination component 508 may determine, autonomously at the UE based at least in part on the BFD-RS, a BFI count for different types of BFI including BFI noise and BFI interference. The detection component 510 may detect a beam failure based at least in part on the BFI count satisfying a threshold.

The determination component 508 may determine the BFI noise or the BFI interference by comparing an SINR measurement of the BFD-RS with an SNR measurement of the BFD-RS, wherein a low SINR and a low SNR indicates the BFI noise, a low SINR and a high SNR indicates the BFI interference, and a high SINR indicates no BFI.

The determination component 508 may identify a first count associated with the BFI noise based at least in part on a first counter dedicated to BFI noise. The determination component 508 may identify a second count associated with the BFI interference based at least in part on a second counter dedicated to BFI interference. The determination component 508 may obtain the BFI count based at least in part on a function that considers the first count, the second count, and a weight associated with the BFI interference, wherein the BFI count includes separate counts for the BFI noise and the BFI interference.

The determination component 508 may provide, as an input to a machine learning model, one or more BFI indication reports and one or more channel measurements associated with the BFD-RS, wherein the one or more channel measurements include one or more of an SINR measurement, an SNR measurement, an RSRP measurement, or an interference measurement. The determination component 508 may obtain, as an output of the machine learning model, the BFI count for the BFI noise and the BFI interference, wherein the BFI count is provided from a physical layer of the UE to a MAC layer of the UE for beam failure detection, and the BFI count includes separate counts for the BFI noise and the BFI interference.

The reception component 502 may receive, from the base station, signaling that configures a first set of options associated with determining different types of BFIs including the BFI noise and the BFI interference, wherein one option from the first set of options is autonomously selected at the UE, and wherein the signaling is received via an RRC configuration or a MAC-CE. The reception component 502 may receive, from the base station, signaling that configures a second set of options associated with determining BFI counts based at least in part on the different types of BFIs, wherein one option from the second set of options is autonomously selected at the UE, and the signaling is received via the RRC configuration or the MAC-CE.

The transmission component 504 may transmit, to the base station via a MAC-CE or uplink control information, UE capability information that indicates one or more of machine learning features of the UE, a processing power and capacity of the UE, a memory configuration of the UE, or computation resources of the UE. The reception component 502 may receive, from the base station via a MAC-CE or downlink control information and based at least in part on the UE capability information, a configuration that activates UE autonomy, deactivates UE autonomy, or changes a UE autonomy level for determining the BFI count and detecting the beam failure based at least in part on the BFI count. The transmission component 504 may transmit, to the base station via a MAC-CE or UCI, a request to activate UE autonomy or deactivate UE autonomy for determining the BFI count and detecting the beam failure based at least in part on the BFI count.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: receiving, from a base station, a beam failure detection reference signal (BFD-RS); determining, autonomously at the UE based at least in part on the BFD-RS, a beam failure instance (BFI) count for different types of BFI including BFI noise and BFI interference; and detecting a beam failure based at least in part on the BFI count satisfying a threshold.

Aspect 2: The method of Aspect 1, wherein the BFI noise indicates that a current radio link quality is affected by signal noise, wherein the BFI interference indicates that the current radio link quality is affected by signal interference, and wherein the BFI interference is associated with a lower priority as compared to the BFI noise for beam failure detection.

Aspect 3: The method of any of Aspects 1 through 2, further comprising: determining the BFI noise or the BFI interference by comparing a signal-to-interference-plus-noise ratio (SINR) measurement of the BFD-RS with a signal-to-noise ratio (SNR) measurement of the BFD-RS, wherein a low SINR and a low SNR indicates the BFI noise, wherein a low SINR and a high SNR indicates the BFI interference, and wherein a high SINR indicates no BFI.

Aspect 4: The method of any of Aspects 1 through 3, wherein determining the BFI count comprises: identifying a first count associated with the BFI noise based at least in part on a first counter dedicated to BFI noise; identifying a second count associated with the BFI interference based at least in part on a second counter dedicated to BFI interference; and obtaining the BFI count based at least in part on a function that considers the first count, the second count, and a weight associated with the BFI interference, wherein the BFI count includes separate counts for the BFI noise and the BFI interference.

Aspect 5: The method of any of Aspects 1 through 4, wherein determining the BFI count comprises: providing, as an input to a machine learning model, one or more BFI indication reports and one or more channel measurements associated with the BFD-RS, wherein the one or more channel measurements include one or more of a signal-to-interference-plus-noise ratio measurement, a signal-to-noise ratio measurement, a reference signal received power measurement, or an interference measurement; and obtaining, as an output of the machine learning model, the BFI count for the BFI noise and the BFI interference, wherein the BFI count is provided from a physical layer of the UE to a medium access control layer of the UE for beam failure detection, and wherein the BFI count includes separate counts for the BFI noise and the BFI interference.

Aspect 6: The method of any of Aspects 1 through 5, further comprising: receiving, from the base station, signaling that configures a first set of options associated with determining different types of BFIs including the BFI noise and the BFI interference, wherein one option from the first set of options is autonomously selected at the UE, and wherein the signaling is received via a radio resource control (RRC) configuration or a medium access control control element (MAC-CE); and receiving, from the base station, signaling that configures a second set of options associated with determining BFI counts based at least in part on the different types of BFIs, wherein one option from the second set of options is autonomously selected at the UE, and wherein the signaling is received via the RRC configuration or the MAC-CE.

Aspect 7: The method of any of Aspects 1 through 6, further comprising: transmitting, to the base station via a medium access control control element (MAC-CE) or uplink control information, UE capability information that indicates one or more of machine learning features of the UE, a processing power and capacity of the UE, a memory configuration of the UE, or computation resources of the UE; and receiving, from the base station via a MAC-CE or downlink control information and based at least in part on the UE capability information, a configuration that activates UE autonomy, deactivates UE autonomy, or changes a UE autonomy level for determining the BFI count and detecting the beam failure based at least in part on the BFI count.

Aspect 8: The method of any of Aspects 1 through 7, further comprising: transmitting, to the base station via a medium access control control element (MAC-CE) or uplink control information, a request to activate UE autonomy or deactivate UE autonomy for determining the BFI count and detecting the beam failure based at least in part on the BFI count.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
        receive, from a base station, a beam failure detection reference signal (BFD-RS);

categorize a beam failure instance (BFI) as either a first type of BFI comprising BFI noise or a second type of BFI comprising BFI interference based at least in part on a signal-to-interference-plus-noise ratio (SINR) associated with the BFD-RS and a signal-to-noise ratio (SNR) associated with the BFD-RS;

determine, autonomously at the UE based at least in part on the BFD-RS, a BFI count that is based at least in part on a function of a first count associated with the first type of BFI comprising the BFI noise and a second count associated with the second type of BFI comprising the BFI interference; and detect a beam failure based at least in part on the BFI count satisfying a threshold.

2. The apparatus of claim 1, wherein the BFI noise indicates that a current radio link quality is affected by signal noise, wherein the BFI interference indicates that the current radio link quality is affected by signal interference, and wherein the BFI interference is associated with a lower priority as compared to the BFI noise for beam failure detection.

3. The apparatus of claim 1, wherein the one or more processors are further configured to:

determine the BFI noise or the BFI interference by comparing an SINR measurement of the BFD-RS with an SNR measurement of the BFD-RS, wherein a low SINR and a low SNR indicates the BFI noise, wherein a low SINR and a high SNR indicates the BFI interference, and wherein a high SINR indicates no BFI.

4. The apparatus of claim 1, wherein the one or more processors, to determine the BFI count, are configured to:

identify the first count associated with the BFI noise based at least in part on a first counter dedicated to BFI noise;

identify the second count associated with the BFI interference based at least in part on a second counter dedicated to BFI interference; and obtain the BFI count based at least in part on the function, wherein the function considers the first count, the second count, and a weight associated with the BFI interference, and wherein the BFI count includes separate counts for the BFI noise and the BFI interference.

5. The apparatus of claim 1, wherein the one or more processors, to determine the BFI count, are configured to:

provide, as an input to a machine learning model, one or more BFI indication reports and one or more channel measurements associated with the BFD-RS, wherein the one or more channel measurements include one or more of an SINR measurement, an SNR measurement, a reference signal received power measurement, or an interference measurement; and obtain, as an output of the machine learning model, the BFI count for the BFI noise and the BFI interference, wherein the BFI count is provided from a physical layer of the UE to a medium access control layer of the UE for beam failure detection, and wherein the BFI count includes separate counts for the BFI noise and the BFI interference.

6. The apparatus of claim 1, wherein the one or more processors are further configured to:

receive, from the base station, signaling that configures a first set of options associated with determining different types of BFIs including the BFI noise and the BFI interference, wherein one option from the first set of options is autonomously selected at the UE, and wherein the signaling is received via a radio resource control (RRC) configuration or a medium access control control element (MAC-CE); and receive, from the base station, signaling that configures a second set of options associated with determining BFI counts based at least in part on the different types of BFIs, wherein one option from the second set of options is autonomously selected at the UE, and wherein the signaling is received via the RRC configuration or the MAC-CE.

7. The apparatus of claim 1, wherein the one or more processors are further configured to:

transmit, to the base station via a medium access control control element (MAC-CE) or uplink control information, UE capability information that indicates one or more of machine learning features of the UE, a processing power and capacity of the UE, a memory configuration of the UE, or computation resources of the UE; and receive, from the base station via a MAC-CE or downlink control information and based at least in part on the UE capability information, a configuration that activates UE autonomy, deactivates UE autonomy, or changes a UE autonomy level for determining the BFI count and detecting the beam failure based at least in part on the BFI count.

8. The apparatus of claim 1, wherein the one or more processors are further configured to:

transmit, to the base station via a medium access control control element or uplink control information, a request to activate UE autonomy or deactivate UE autonomy for determining the BFI count and detecting the beam failure based at least in part on the BFI count.

9. A method of wireless communication performed by a user equipment (UE), comprising:

receiving, from a base station, a beam failure detection reference signal (BFD-RS);

categorizing a beam failure instance (BFI) as either a first type of BFI comprising BFI noise or a second type of BFI comprising BFI interference based at least in part on a signal-to-interference-plus-noise ratio (SINR) associated with the BFD-RS and a signal-to-noise ratio (SNR) associated with the BFD-RS;

determining, autonomously at the UE based at least in part on the BFD-RS, a BFI count that is based at least in part on a function of a first count associated with the first type of BFI comprising the BFI noise and a second count associated with the second type of BFI comprising the BFI interference; and detecting a beam failure based at least in part on the BFI count satisfying a threshold.

10. The method of claim 9, wherein the BFI noise indicates that a current radio link quality is affected by signal noise, wherein the BFI interference indicates that the current radio link quality is affected by signal interference, and wherein the BFI interference is associated with a lower priority as compared to the BFI noise for beam failure detection.

11. The method of claim 9, further comprising:

determining the BFI noise or the BFI interference by comparing an SINR measurement of the BFD-RS with an SNR measurement of the BFD-RS, wherein a low SINR and a low SNR indicates the BFI noise, wherein a low SINR and a high SNR indicates the BFI interference, and wherein a high SINR indicates no BFI.

12. The method of claim 9, wherein determining the BFI count comprises:

identifying the first count associated with the BFI noise based at least in part on a first counter dedicated to BFI noise;

identifying the second count associated with the BFI interference based at least in part on a second counter dedicated to BFI interference; and obtaining the BFI count based at least in part on the function, wherein the function considers the first count, the second count, and a weight associated with the BFI interference, and wherein the BFI count includes separate counts for the BFI noise and the BFI interference.

13. The method of claim 9, wherein determining the BFI count comprises:

providing, as an input to a machine learning model, one or more BFI indication reports and one or more channel measurements associated with the BFD-RS, wherein the one or more channel measurements include one or more of an SINR measurement, an SNR measurement, a reference signal received power measurement, or an interference measurement; and obtaining, as an output of the machine learning model, the BFI count for the BFI noise and the BFI interference, wherein the BFI count is provided from a physical layer of the UE to a medium access control layer of the UE for beam failure detection, and wherein the BFI count includes separate counts for the BFI noise and the BFI interference.

14. The method of claim 9, further comprising:

receiving, from the base station, signaling that configures a first set of options associated with determining different types of BFIs including the BFI noise and the BFI interference, wherein one option from the first set of options is autonomously selected at the UE, and wherein the signaling is received via a radio resource control (RRC) configuration or a medium access control control element (MAC-CE); and receiving, from the base station, signaling that configures a second set of options associated with determining BFI counts based at least in part on the different types of BFIs, wherein one option from the second set of options is autonomously selected at the UE, and wherein the signaling is received via the RRC configuration or the MAC-CE.

15. The method of claim 9, further comprising:

transmitting, to the base station via a medium access control control element (MAC-CE) or uplink control information, UE capability information that indicates one or more of machine learning features of the UE, a processing power and capacity of the UE, a memory configuration of the UE, or computation resources of the UE; and receiving, from the base station via a MAC-CE or downlink control information and based at least in part on the UE capability information, a configuration that activates UE autonomy, deactivates UE autonomy, or changes a UE autonomy level for determining the BFI count and detecting the beam failure based at least in part on the BFI count.

16. The method of claim 9, further comprising:

transmitting, to the base station via a medium access control control element or uplink control information, a request to activate UE autonomy or deactivate UE autonomy for determining the BFI count and detecting the beam failure based at least in part on the BFI count.

17. A non-transitory computer-readable medium storing a set of instructions for wireless communication, the set of instructions comprising:

one or more instructions that, when executed by one or more processors of a user equipment (UE), cause the UE to:

receive, from a base station, a beam failure detection reference signal (BFD-RS);

categorize a beam failure instance (BFI) as either a first type of BFI comprising BFI noise or a second type of BFI comprising BFI interference based at least in part on a signal-to-interference-plus-noise ratio (SINR) associated with the BFD-RS and a signal-to-noise ratio (SNR) associated with the BFD-RS;

determine, autonomously at the UE based at least in part on the BFD-RS, a BFI count that is based at least in part on a function of a first count associated with the first type of BFI comprising the BFI noise and a second count associated with the second type of BFI comprising the BFI interference; and detect a beam failure based at least in part on the BFI count satisfying a threshold.

18. The non-transitory computer-readable medium of claim 17, wherein the one or more instructions further cause the UE to:

determine the BFI noise or the BFI interference by comparing an SINR measurement of the BFD-RS with an SNR measurement of the BFD-RS, wherein a low SINR and a low SNR indicates the BFI noise, wherein a low SINR and a high SNR indicates the BFI interference, and wherein a high SINR indicates no BFI.

19. The non-transitory computer-readable medium of claim 17, wherein the one or more instructions, that cause the UE to determine the BFI count, cause the UE to:

identify the first count associated with the BFI noise based at least in part on a first counter dedicated to BFI noise;

identify the second count associated with the BFI interference based at least in part on a second counter dedicated to BFI interference; and obtain the BFI count based at least in part on the function, wherein the function considers the first count, the second count, and a weight associated with the BFI interference, and wherein the BFI count includes separate counts for the BFI noise and the BFI interference.

20. The non-transitory computer-readable medium of claim 17, wherein the one or more instructions, that cause the UE to determine the BFI count, cause the UE to:

provide, as an input to a machine learning model, one or more BFI indication reports and one or more channel measurements associated with the BFD-RS, wherein the one or more channel measurements include one or more of an SINR measurement, an SNR measurement, a reference signal received power measurement, or an interference measurement; and obtain, as an output of the machine learning model, the BFI count for the BFI noise and the BFI interference, wherein the BFI count is provided from a physical layer of the UE to a medium access control layer of the UE for beam failure detection, and wherein the BFI count includes separate counts for the BFI noise and the BFI interference.

21. The non-transitory computer-readable medium of claim 17, wherein the one or more instructions further cause the UE to:

receive, from the base station, signaling that configures a first set of options associated with determining different types of BFIs including the BFI noise and the BFI interference, wherein one option from the first set of options is autonomously selected at the UE, and wherein the signaling is received via a radio resource control (RRC) configuration or a medium access control control element (MAC-CE); and receive, from the base station, signaling that configures a second set of options associated with determining BFI counts based at least in part on the different types of BFIs, wherein one option from the second set of options is autonomously selected at the UE, and wherein the signaling is received via the RRC configuration or the MAC-CE.

22. The non-transitory computer-readable medium of claim 17, wherein the one or more instructions further cause the UE to:
transmit, to the base station via a medium access control control element (MAC-CE) or uplink control information, UE capability information that indicates one or more of machine learning features of the UE, a processing power and capacity of the UE, a memory configuration of the UE, or computation resources of the UE; and
receive, from the base station via a MAC-CE or downlink control information and based at least in part on the UE capability information, a configuration that activates UE autonomy, deactivates UE autonomy, or changes a UE autonomy level for determining the BFI count and detecting the beam failure based at least in part on the BFI count.

23. The non-transitory computer-readable medium of claim 17, wherein the one or more instructions further cause the UE to:
transmit, to the base station via a medium access control control element or uplink control information, a request to activate UE autonomy or deactivate UE autonomy for determining the BFI count and detecting the beam failure based at least in part on the BFI count.

24. An apparatus for wireless communication, comprising:
means for receiving, from a base station, a beam failure detection reference signal (BFD-RS);
means for categorizing a beam failure instance (BFI) as either a first type of BFI comprising BFI noise or a second type of BFI comprising BFI interference based at least in part on a signal-to-interference-plus-noise ratio (SINR) associated with the BFD-RS and a signal-to-noise ratio (SNR) associated with the BFD-RS;
means for determining, autonomously at the apparatus based at least in part on the BFD-RS, a BFI count that is based at least in part on a function of a first count associated with the first type of BFI comprising the BFI noise and a second count associated with the second type of BFI comprising the BFI interference; and
means for detecting a beam failure based at least in part on the BFI count satisfying a threshold.

25. The apparatus of claim 24, further comprising:
means for determining the BFI noise or the BFI interference by comparing an SINR measurement of the BFD-RS with an SNR measurement of the BFD-RS, wherein a low SINR and a low SNR indicates the BFI noise, wherein a low SINR and a high SNR indicates the BFI interference, and wherein a high SINR indicates no BFI.

26. The apparatus of claim 24, wherein the means for determining the BFI count comprises:
means for identifying the first count associated with the BFI noise based at least in part on a first counter dedicated to BFI noise;
means for identifying the second count associated with the BFI interference based at least in part on a second counter dedicated to BFI interference; and
means for obtaining the BFI count based at least in part on the function, wherein the function considers the first count, the second count, and a weight associated with the BFI interference, and wherein the BFI count includes separate counts for the BFI noise and the BFI interference.

27. The apparatus of claim 24, wherein the means for determining the BFI count comprises:
means for providing, as an input to a machine learning model, one or more BFI indication reports and one or more channel measurements associated with the BFD-RS, wherein the one or more channel measurements include one or more of an SINR measurement, an SNR measurement, a reference signal received power measurement, or an interference measurement; and
means for obtaining, as an output of the machine learning model, the BFI count for the BFI noise and the BFI interference, wherein the BFI count is provided from a physical layer of the apparatus to a medium access control layer of the apparatus for beam failure detection, and wherein the BFI count includes separate counts for the BFI noise and the BFI interference.

28. The apparatus of claim 24, further comprising:
means for receiving, from the base station, signaling that configures a first set of options associated with determining different types of BFIs including the BFI noise and the BFI interference, wherein one option from the first set of options is autonomously selected at the apparatus, and wherein the signaling is received via a radio resource control (RRC) configuration or a medium access control control element (MAC-CE); and
means for receiving, from the base station, signaling that configures a second set of options associated with determining BFI counts based at least in part on the different types of BFIs, wherein one option from the second set of options is autonomously selected at the apparatus, and wherein the signaling is received via the RRC configuration or the MAC-CE.

29. The apparatus of claim 24, further comprising:
means for transmitting, to the base station via a medium access control control element (MAC-CE) or uplink control information, apparatus capability information that indicates one or more of machine learning features of the apparatus, a processing power and capacity of the apparatus, a memory configuration of the apparatus, or computation resources of the apparatus; and
means for receiving, from the base station via a MAC-CE or downlink control information and based at least in part on the apparatus capability information, a configuration that activates apparatus autonomy, deactivates apparatus autonomy, or changes an apparatus autonomy level for determining the BFI count and detecting the beam failure based at least in part on the BFI count.

30. The apparatus of claim 24, further comprising:
means for transmitting, to the base station via a medium access control control element or uplink control information, a request to activate apparatus autonomy or deactivate apparatus autonomy for determining the BFI count and detecting the beam failure based at least in part on the BFI count.

* * * * *